Patented June 12, 1928.

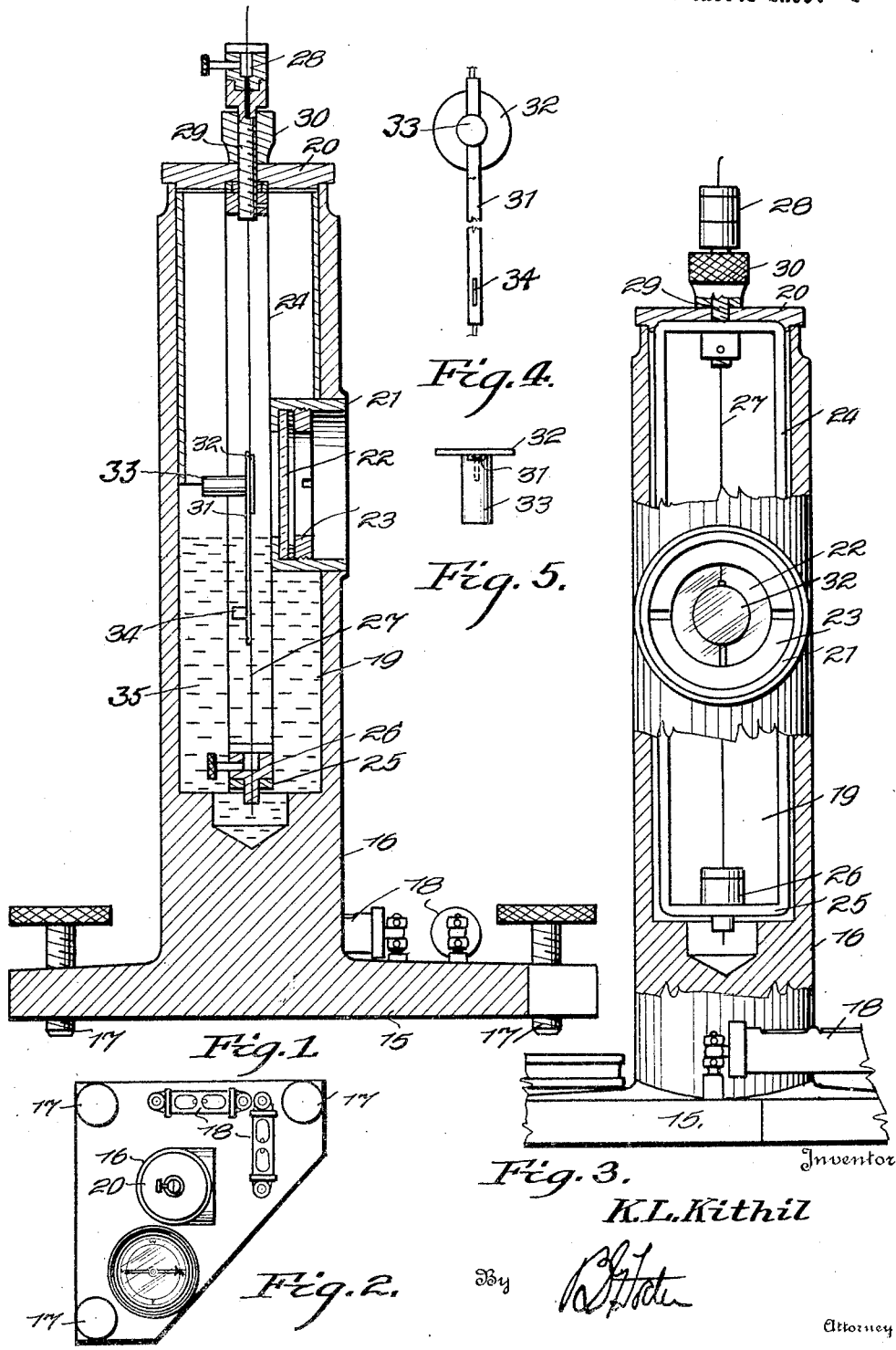

1,672,892

UNITED STATES PATENT OFFICE.

KARL LUDWIG KITHIL, OF DENVER, COLORADO.

SEISMO VIBROMETER.

Application filed February 18, 1926. Serial No. 89,190.

The present invention relates to apparatus for indicating or determining vibrations, and is in the nature of an improvement or modification on the structure disclosed in my copending application, Serial No. 76,916, filed December 21, 1925.

One of the primary objects in the present case is to provide an association of elements, by means of which a torsional strand can be used as a support for the reflecting or indicator element and for a pendulum mass, the latter being engaged by a suitable damping fluid, while the former is free from such fluid. With such an arrangement it becomes immaterial whether the fluid is clearly transparent, as the reflector is free from the same and the beam of light transmitted to and returned by said reflector does not have to pass through the fluid.

In the accompanying drawings:—

Figure 1 is a vertical sectional view through the preferred embodiment of the invention, Figure 2 is a plan view, Figure 3 is a front elevation, partly in section.

Figure 4 is a rear elevation of the reflector and pendulum mass,

Figure 5 is a top plan view of the same,

Figure 6:
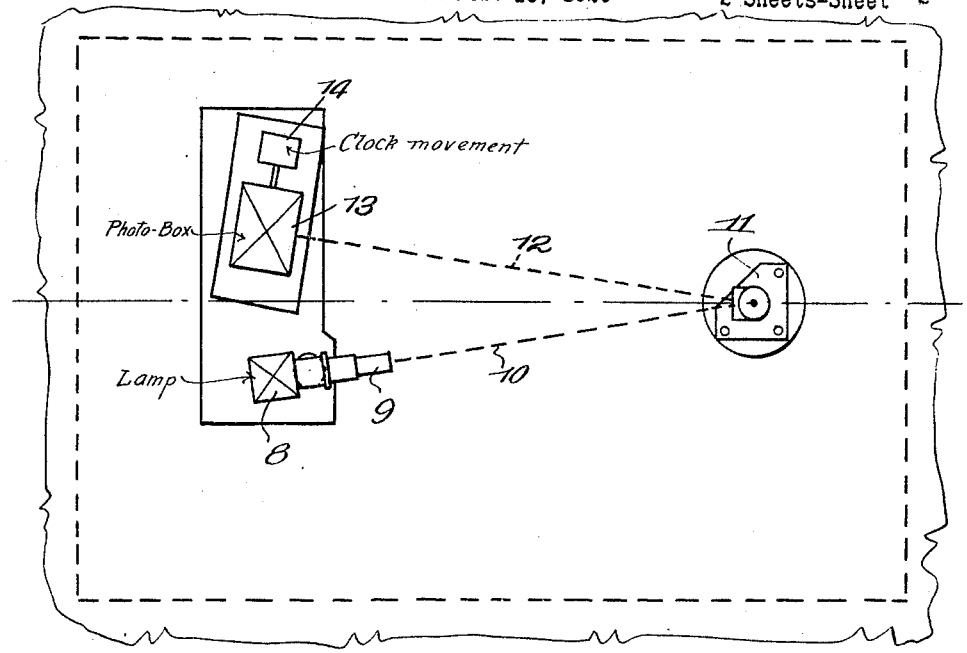
Figure 6 is a diagrammatic view indicating the manner in which the apparatus is used.
Figure 7:
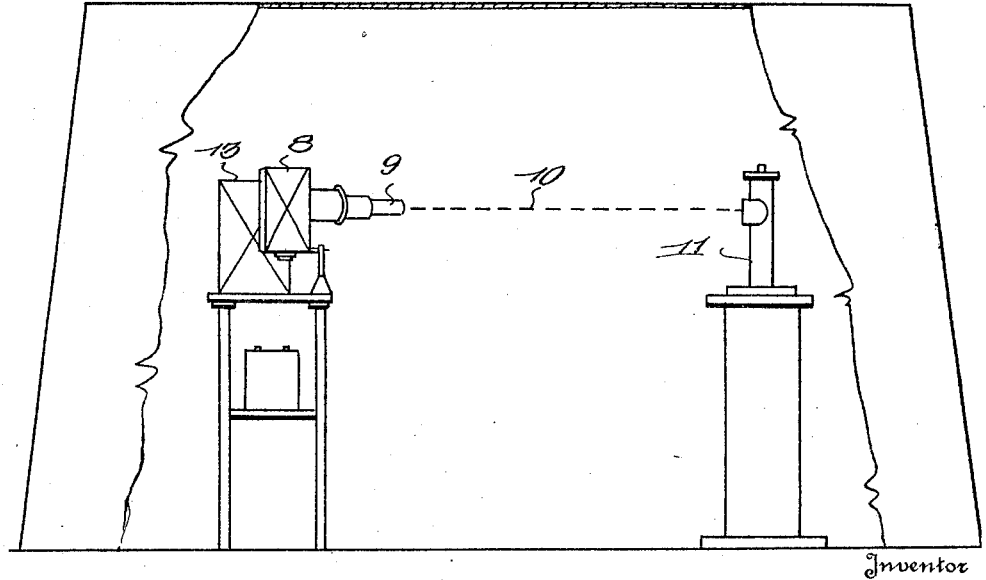
Figure 7 is a side elevation of the structure shown in Figure 6.

As outlined in Figures 6 and 7, a suitable lamp 8 is employed that is provided with means 9 for projecting a pencil of light 10 to a reflecting apparatus, generally designated by the reference numeral 11. This apparatus returns said pencil of light, as indicated at 12, in an angular relation to a recording means 13. The recording means, as is well known, may be a strip sensitive to light and moved continuously by a suitable motor, as 14. The apparatus 11 constitutes the particular subject-matter of the present invention, and is illustrated in Figures 1 to 5 inclusive.

A base 15 is employed, having a vertical standard 16 thereon, which may or may not be integral with the base. This base is adapted to be supported on feet 17 in the form of adjustable screws, by means of which the proper vertical disposition of the standard 16 may be obtained. Spirit levels 18 may be mounted on the base in order to determine the aforesaid proper disposition.

The standard is provided with a vertical chamber 19 closed at its top by a removable cap 20. In one side wall of the chamber is formed a view opening defined by a sleeve 21, and extending across this view opening is a suitable glass or lens 22 held in place by a threaded bushing 23.

Carried by the cap 20 and suspended centrally in the chamber 19 is an open frame 24, the lower cross bar 25 of which carries a clamp 26. Secured by this clamp is the lower end of a vertically disposed torsional strand 27, the upper end of which is secured by a clamp 28. The clamp 28 is vertically adjustable, being carried by the upper end of a stem 29 passing through the cap 20 and having threaded thereon a tension nut 30. The strand 27 is preferably in the form of a flat ribbon of metal, and has fastened near its central portion a strip 31. Secured to the strand at the upper end of the strip is a reflector 32 that is located behind the glass or lens 22 of the view opening and has a pendulum mass 33 projecting rearwardly therefrom. The lower end portion of the strip 31 is provided with an outstanding vertical damping vane 34 that is located at a point lower than the reflector. Damping liquid 35, such as a liquid paraffin, oil or the like is placed in the lower portion of the chamber 19, its top surface or level being preferably above the damping vane 34 and below the reflector 32.

With this construction, it will be evident that when properly set up and related to the light projecting means 8 and the recording means 13—14, a pencil of light from the former will be projected against the reflector 32 and deflected to the recorder. Any jar or vibration imparted to the apparatus 11 will cause the pendulum and consequently the reflector to turn on a vertical axis, thus deflecting the reflected pencil of light and producing a wave record on the reflecting strip, the length of these waves depending on the amount of vibration of the reflector.

With this construction it will be evident that while the vane 34 is submerged in the damping liquid, the reflector is above said liquid and therefore the pencil of light is not subject to any distortion or interference from the liquid.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:—

In apparatus of the character set forth, the combination with a casing forming a chamber and having a view opening in one of its side walls, of a torsional strand located longitudinally in the chamber and extending behind the view opening, a reflector secured to the strand and located behind the view opening, and a damping vane secured to the strand and located in the chamber at a lower point than the reflector, said chamber containing a damping liquid in its lower portion, said liquid being engaged by the vane, and said reflector being free from the damping liquid.

In testimony whereof, I affix my signature.

KARL LUDWIG KITHIL.